(12) United States Patent
Thenander et al.

(10) Patent No.: US 12,110,136 B2
(45) Date of Patent: Oct. 8, 2024

(54) ASSEMBLY COMPRISING A MULTIPLE PAYLOAD SET AND GROUND SUPPORT EQUIPMENT

(71) Applicant: BEYOND GRAVITY SWEDEN AB, Gothenburg (SE)

(72) Inventors: Magnus Thenander, Linköping (SE); Johan Öhlin, Rimforsa (SE)

(73) Assignee: BEYOND GRAVITY SWEDEN AB, Gothenburg (SE)

( * ) Notice: Subject to any disclaimer, the term of this patent is extended or adjusted under 35 U.S.C. 154(b) by 153 days.

(21) Appl. No.: 17/857,464

(22) Filed: Jul. 5, 2022

(65) Prior Publication Data

US 2022/0332442 A1  Oct. 20, 2022

Related U.S. Application Data

(63) Continuation of application No. 16/633,795, filed as application No. PCT/SE2017/050797 on Jul. 28, 2017, now abandoned.

(51) Int. Cl.
*B64G 1/64* (2006.01)
*B64G 5/00* (2006.01)

(52) U.S. Cl.
CPC .............. *B64G 5/00* (2013.01); *B64G 1/644* (2023.08)

(58) Field of Classification Search
CPC ........... B64G 1/643; B64G 1/644; B64G 5/00
See application file for complete search history.

(56) References Cited

U.S. PATENT DOCUMENTS

| 4,932,607 A | 6/1990 | Layton et al. |
| 5,411,226 A | 5/1995 | Jones et al. |

(Continued)

FOREIGN PATENT DOCUMENTS

| EP | 3385173 A1 | 10/2018 |
| KR | 20110076159 A * | 7/2011 |

(Continued)

OTHER PUBLICATIONS

Extended European Search Report mailed May 3, 2021 for European Patent Application No. 17919126.7, 14 pages.

(Continued)

*Primary Examiner* — Joseph W Sanderson
(74) *Attorney, Agent, or Firm* — Sage Patent Group

(57) ABSTRACT

An assembly comprising a multiple payload set for a launch vehicle and a stiff and rigid ground support equipment. The multiple payload set comprising a plurality of payloads, wherein the plurality of payloads are interconnected via a non-self-supported connection structure before assembly of the multiple payload set to a dispenser body. Each payload comprises first attachment means attached to the non-self-supported connection structure, wherein the non-self-supported connection structure comprises second attachment means attached to the ground support equipment, for attachment of the multiple payload set to the dispenser body. The ground support equipment is attached to the multiple payload set via the second attachment means to reinforce and secure the multiple payload set to enable transport and maneuverability of the multiple payload set without jeopardizing the non-self-supported connection structure.

20 Claims, 13 Drawing Sheets

(56) References Cited

U.S. PATENT DOCUMENTS

| | | | |
|---|---|---|---|
| 5,613,653 A | 3/1997 | Bombled et al. | |
| 5,720,450 A | 2/1998 | Kanne | |
| 6,138,951 A | 10/2000 | Budris et al. | |
| 7,900,547 B2* | 3/2011 | Atmur | F41F 3/04 89/1.82 |
| 9,463,882 B1 | 10/2016 | Field et al. | |
| 9,796,488 B2* | 10/2017 | Cook | B64G 1/64 |
| 10,486,837 B2* | 11/2019 | Field | B64G 1/641 |
| 10,518,912 B2* | 12/2019 | Arulf | B64G 1/002 |
| 10,538,348 B2* | 1/2020 | Riskas | B64G 1/641 |
| 10,604,280 B2* | 3/2020 | Burt | B64G 1/58 |
| 10,633,123 B2* | 4/2020 | Chiang | B64G 1/641 |
| 11,208,218 B2* | 12/2021 | Lim | B64G 1/222 |
| 2016/0318635 A1 | 11/2016 | Field et al. | |
| 2016/0368625 A1 | 12/2016 | Field et al. | |
| 2017/0096240 A1* | 4/2017 | Cook | B64G 1/645 |
| 2017/0320597 A1* | 11/2017 | Lim | B64G 1/641 |
| 2018/0170586 A1* | 6/2018 | Riskas | B64G 1/10 |
| 2018/0251241 A1* | 9/2018 | Burt | B64G 1/50 |
| 2018/0290771 A1* | 10/2018 | Chiang | B64G 1/645 |
| 2018/0327119 A1* | 11/2018 | Arulf | B64G 1/645 |
| 2020/0198812 A1* | 6/2020 | Thenander | B64G 1/641 |

FOREIGN PATENT DOCUMENTS

| | | | | |
|---|---|---|---|---|
| KR | 20120138163 A | * | 12/2012 | |
| KR | 101498829 B1 | * | 3/2015 | |
| KR | 20180044745 A | * | 5/2018 | |
| WO | WO-0189927 A1 | * | 11/2001 | B64G 1/002 |

OTHER PUBLICATIONS

International Search Report and Written Opinion mailed Apr. 13, 2018 for PCT/SE2017/050797, 14 pages.

* cited by examiner

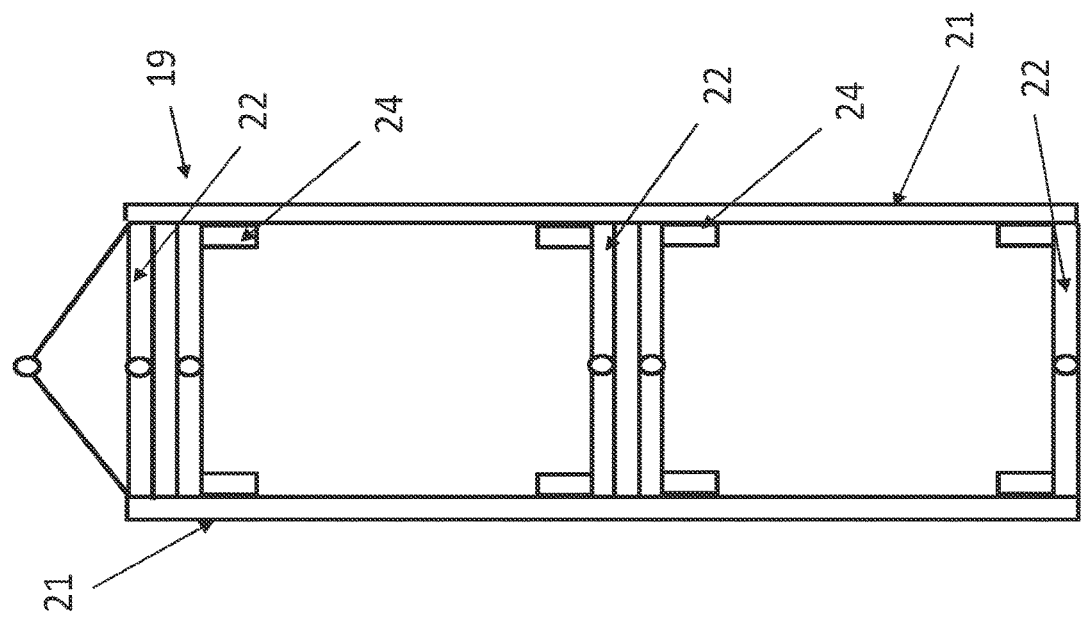
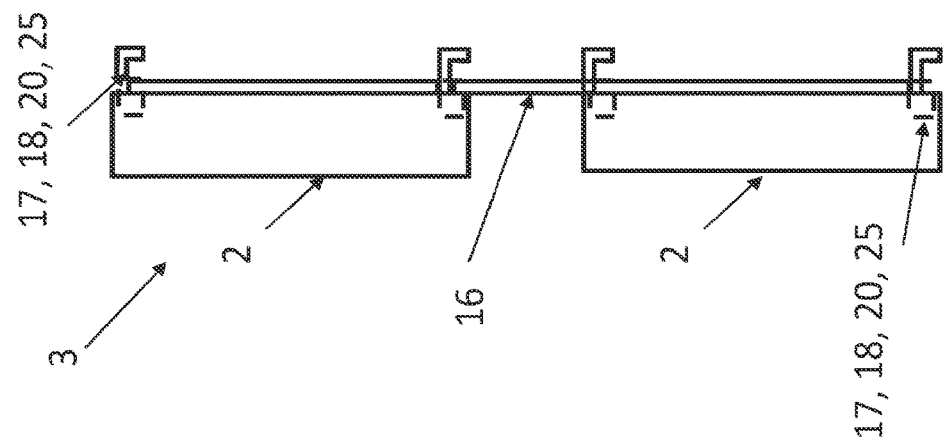

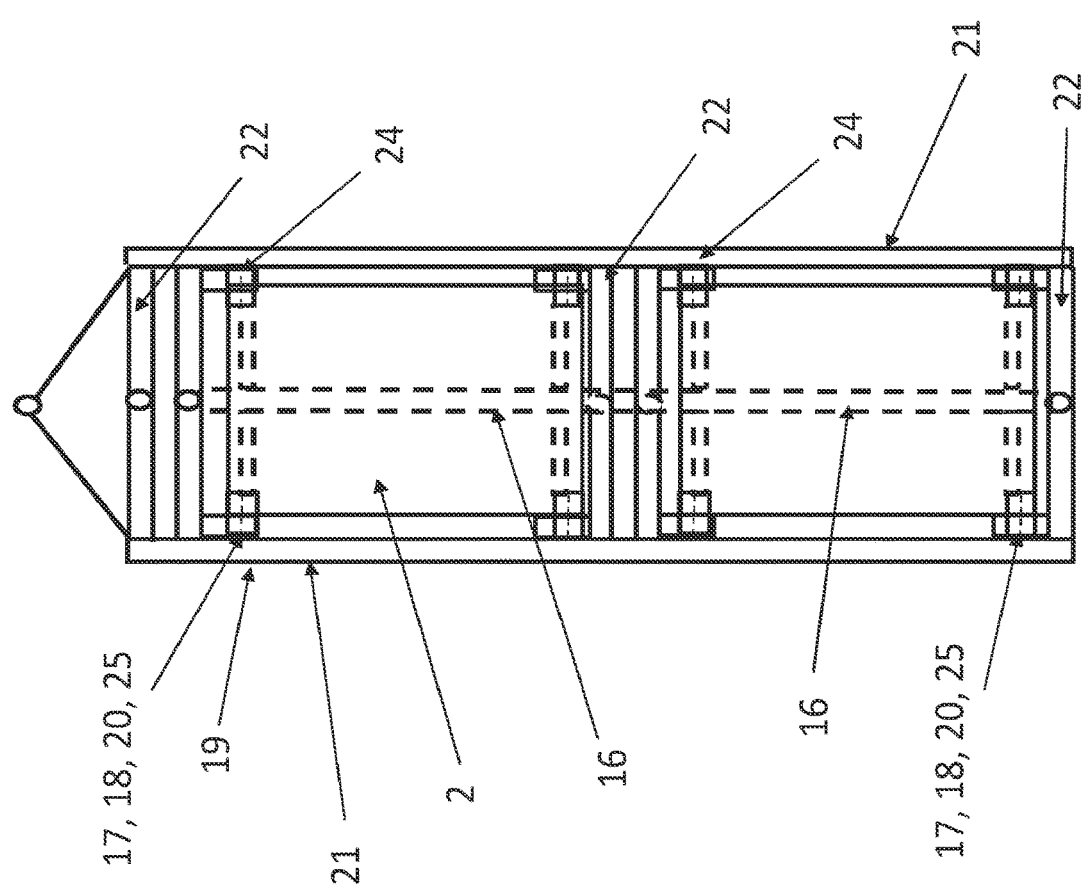

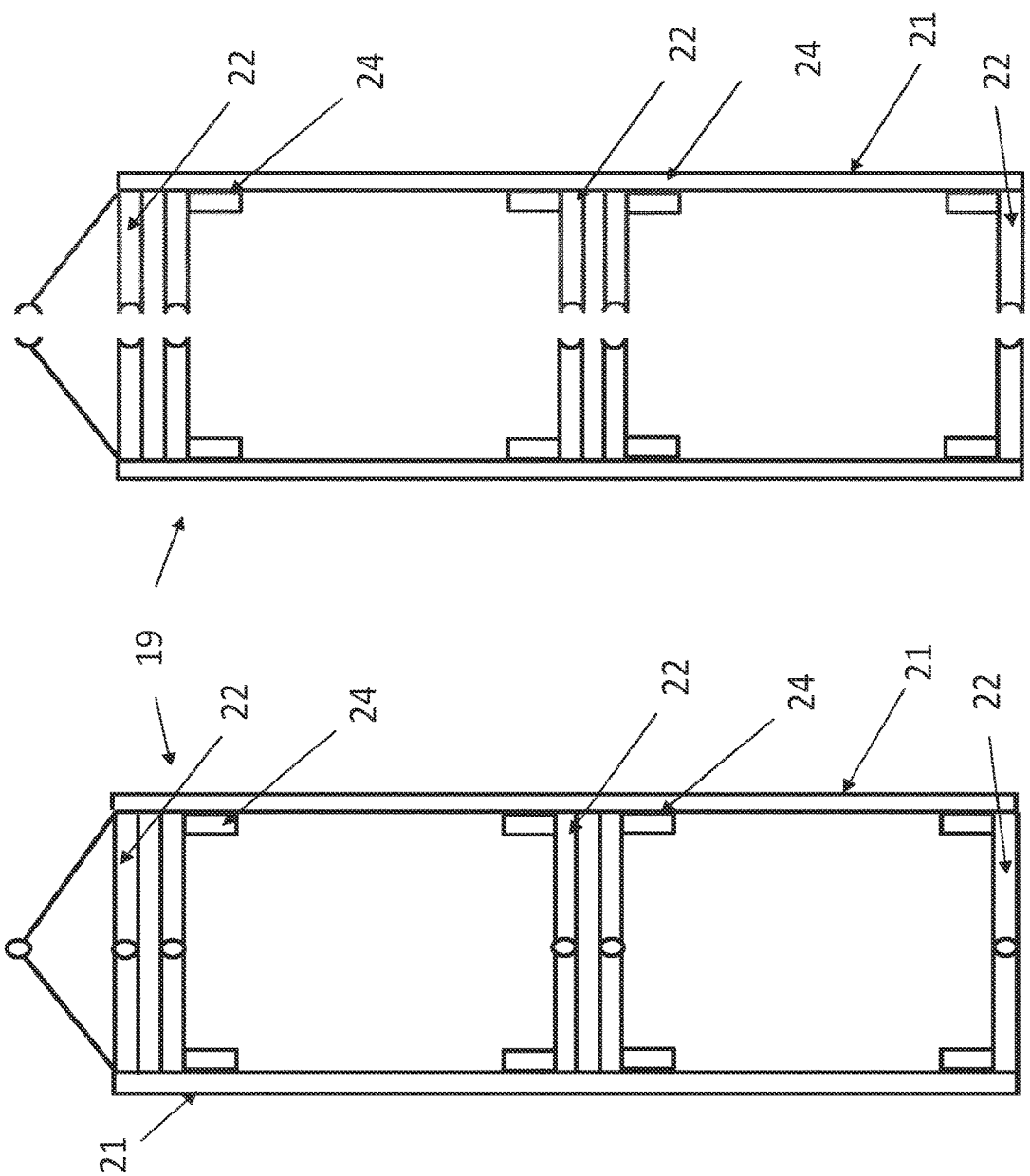

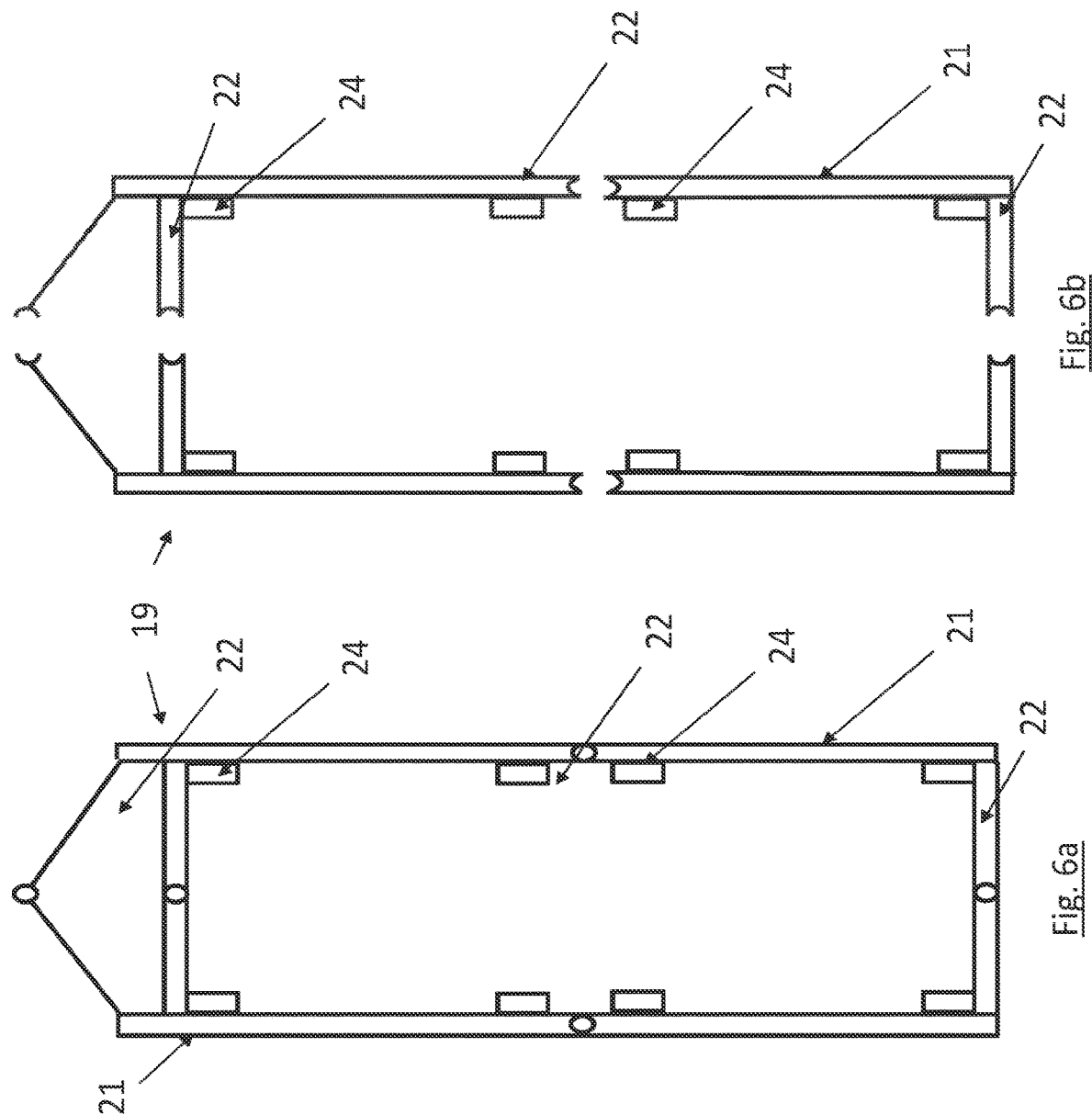

ASSEMBLY COMPRISING A MULTIPLE PAYLOAD SET AND GROUND SUPPORT EQUIPMENT

CROSS-REFERENCE TO RELATED APPLICATIONS

This application is a continuation of U.S. application Ser. No. 16/633,795 filed on Jan. 24, 2020, which is a United States national phase application of International Application No. PCT/SE2017/050797 filed on Jul. 28, 2017. Each of these applications is incorporated herein by reference in its entirety.

TECHNICAL FIELD

The present disclosure relates to a multiple payload set for a launch vehicle. The multiple payload set comprises a plurality of payloads. The disclosure further relates to a payload dispenser comprising a multiple payload set. The disclosure further relates to a ground support equipment arranged to transport the multiple payload set and a method for using the ground support equipment during transport and assembly of the multiple payload set to the payload dispenser.

BACKGROUND

It is today desirable to launch many payloads from each launch vehicle in order to maximize the use of the launch vehicle. The advance in technology allows for smaller payloads, for example satellites, to carry out the same task as yesterday's payloads which enables the possibility to launch more payloads without increasing the weight too much. Furthermore, there is a desire to launch a large plurality of payloads in the form of satellites that are spread out in orbit to cover a large area on the ground. The number of payloads can be hundreds and more. The present assembly of payloads onto a dispenser body is done by attaching the payloads one by one and attaching suitable connections between the payloads during assembly. There is of course a need to minimize the space between the payloads in order to be able to fit as many payloads as possible to the dispenser body. Hence, one problem originates from the fact that it becomes very difficult and time consuming in practice to mount one satellite at a time on the dispenser body due to a very limited space between the payloads. Hence, there is a need to find an improved assembly of payloads to a dispenser body that remedies the above deficiencies.

SUMMARY

An object of the present disclosure is to provide a method for integration of a multiple payload set to a dispenser in a launch vehicle. The multiple payload set comprises a plurality of payloads. The disclosure also relates to an assembly comprising a multiple payload set for a launch vehicle, and a stiff and rigid ground support equipment, as well as a method for assembling a payload dispenser. The disclosure further relates to a payload dispenser comprising a multiple payload set. The disclosure further relates to a ground support equipment arranged to transport the multiple payload set and a method for using the ground support equipment during transport and assembly where the previously mentioned problems are avoided. This object is at least partly achieved by the features of the independent claims.

The dependent claims contain further developments of the multiple payload set, the payload dispenser and the method for assembly.

The plurality of payloads is interconnected via a non-self-supported connection structure before assembly of the multiple payload set to the dispenser body. Each payload comprises first attachment means attachable to the connection structure. The connection structure comprises second attachment means attached to a ground support equipment, GSE, for attachment of the multiple payload set to the dispenser body.

The benefit of the multiple payload set is that a large number of payloads can be mounted at the dispenser body at the same time. The number of payloads can vary, but the more payloads that can be pre-connected via the connection structure the better the efficiency during assembly.

Here, non-self-supported connection structure refers to that the structure between the payloads cannot support the multiple payload set to be lifted and maneuvered. The connection structure is intended to be as light weight as possible to reduce weight but should support and collect signal cords inter-connecting the payloads and connecting the payloads to a control unit. The signal cords can be wire, optical fiber or any other suitable cord or bus. One reason for connecting the payloads is to enable the possibility to release the payloads in a certain order.

According to one example, the connection structure is a rail structure. Here, rail structure refers to an array of interconnected elongated portions. The elongated portion may be a tube-like element with a cross-section being circular, oval, and polygonal or a combination thereof. The tube-like element can be at least partly open along its elongated direction. Hence, the tube-like element, at least partly, may comprise U-shaped portions. The tube-like element comprises openings in connection to another tube-like element being connected to it. The connected tube-like elements create the rail structure.

According to one example, the connection structure is designed to align the payloads according to a predetermined pattern. The alignment can be done by applying the connection structure in a firm construction jig having a predetermined pattern in which the connection structure fits. The payloads are then applied to the connection structure in a predetermined pattern according to the jig pattern. The GSE can then be applied to the multiple payload set via the second attachment means to reinforce and secure the multiple payload set to enable transport and maneuverability of the multiple payload set without jeopardizing the connection structure.

The second attachment means are arranged in connection to the first attachment means. The connection structure comprises reinforcement means arranged to mechanically connect the second attachment means to the first attachment means to form a load bearing structure. Hence, the connection structure comprises at least one reinforced portion in the position where the first attachment means is attached to the connection structure. The first attachment means is thus attached to the reinforcement means which in turn connects the first attachment means to the second attachment means so that the GSE can lift the multiple payload set via the second attachment means. According to one example, the first attachment means are also attachment means for the multiple payload set to the dispenser body. The first attachment means can be bolt that runs from and/or through the payload and/or through the reinforcement means and/or through the dispenser body. The first attachment means has fastening means that secures the first attachment means in position, for example a nut or a similar devise that can secure the multiple payload set in position on the dispenser body. According to one example, the first attachment means are separation devices that are interconnected to each other for enabling separation of the payload from the dispenser body and from the connection structure. Each separation device comprises two portions interconnected to each other and secured to each other via a secure and release means that upon activation separates the two portions.

Depending on design, each payload comprises at least one first attachment means. However, it has been shown that four first attachment means gives a good symmetry and control when separating the payload. However, the payload and multiple payload set is not restricted to four attachment means. The number of second attachment means is dependent on the design of the GSE, but a maximum number of second attachment means corresponds to the number of first attachment means. The GSE could be designed and arranged to attach to one or more second attachment means on each side of the multiple payload set on order to secure a tilting/lifting operation. Here, the second attachment means secures the multiple payload set in a X-Y plane hindering movement of the multiple payload set in the X-Y plane with relation to the GSE. The GSE is designed and arranged to interconnect all payloads in the multiple payload set accordingly. The GSE has an elongation in the X-direction and a width in the Y-direction. The GSE is designed and arranged to create a bearing structure in the X-Y plane to hinder that the multiple payload set moves in a Z direction being perpendicular to the X-Y plane. According to one example, the GSE is to be designed and arranged to connect solely to the second attachment means. According to one example, the GSE is designed and arranged to bear against further parts of the multiple payload set in addition to just the second attachment means.

The GSE comprises at least two longitudinally extending construction elements, hereinafter called longitudinal beams, and at least two laterally extending beams, hereinafter called lateral beams. The GSE is arranged to be assembled in connection to an assembled multiple payload set. The different portions, i.e. the beams, of the GSE is connected to the multiple payload set according to the above and secured with relation to each other forming a stiff and rigid GSE that can transport and maneuver the multiple payload set. Depending on how the multiple payload set is done and how the multiple payload set is oriented, the GSE can either be assembled before being connected to the multiple payload set or after being connected to the multiple payload set. One advantage with the GSE is its versatility that allows for the possibility to use the GSE regardless of the situation of the multiple payload set.

After the multiple payload set has been transported and maneuvered into position on the dispenser body, the multiple payload set is secured to the dispenser body and the GSE shall be removed. The GSE is arranged to be knocked down into a collapsed state where at least parts of the assembled GSE are detached from each other. The GSE is designed and arranged to fit between two neighboring payloads so that the parts/beams can be removed in that space.

Hence, in the assembled state the beams form a frame designed to fit to carry the subset of payloads, and in a collapsed state the longitudinal beams and/or the laterally extending beams are designed to fit and be removed between two neighboring payloads attached to the payload dispenser.

However, the beams in the GSE may comprise beam portions arranged to be attached to each other to form the beams. The beams can be disassembled into the beam portions to allow for easy removal of the portions. The beams and beam portions can thus be arranged to be removed between two adjacent payloads, but may also be removed by extraction between the payloads and the dispenser body.

The beam can be formed as one single entity or may be formed by a number of parts, for example as a framework of parts that gives a lightweight but strong construction. The different beams or portions of the different beams may be formed as a single entity while other beams or portions of the different beams may be formed by a number of parts.

According to one example, the longitudinally extending beams comprise third attachment means attachable to the second attachment means in the multiple payload set. The third attachment means are designed and arranged to correspond to the design and arrangement of the second attachment means in order to secure the multiple payload set in the X-Y plane and in the Z-direction when attached. The second attachment means and the third attachment means can be in any suitable form that allows for easy attachment and detachment of the multiple payload set.

As mentioned above, the invention refers also to a payload dispenser comprising a multiple payload set according to what has been described above.

According to one example, the payload dispenser comprises rail unit ring brackets mounted onto an envelope surface of the dispenser body. The rail unit ring bracket can have different purposes depending on design of the multiple payload set and the dispenser body. The rail unit ring bracket can serve as a reinforcement structure for the dispenser body. The rail unit ring bracket can also have specially designed parts that allows for easy attachment of the payload assemblies to the dispenser body.

According to one example, the rail unit ring brackets comprise through opening for receiving the first attachment means on the multiple payload set during attachment of the multiple payload set to the dispenser body.

The dispenser body is formed of one or more ring shaped bodies. The ring shaped body can have a circular cross-section or an oval cross-section or a polygonal cross-section or may be formed in any suitable shape corresponding to the design of the dispenser body. Here, cross-section refers to a plane running through the entire rail unit ring bracket, i.e. in the radial direction with respect to a centrum axle coinciding with the height direction of the dispenser body.

According to one example, the dispenser body comprises a plurality of panels, wherein at least one panel comprises at least one multiple payload set mounted onto the panel. The panels are attachable to each other forming a self-supporting dispenser. The panel built dispenser body may have a polygonal cross-section should the panels be flat, but may have circular or oval cross-section should the panels have an arched surface.

The invention also refers a method for assembling a payload dispenser, wherein the method comprises the following steps:
 attaching a plurality of payloads to a non-self-supported connection structure via first attachment means creating a multiple payload set;
 attaching a ground support equipment, GSE, to the connection structure, the GSE, comprising third attachment means and the connection structure comprising second attachment means comprised in the connection structure being connected to the first attachment means via reinforcement means, wherein the third attachment means are attached to the second attachment means when attaching the GSE to the connection structure;

transporting the ground support equipment, GSE, and the attached multiple payload set;

maneuvering the ground support equipment, GSE, and the attached multiple payload set into position with relation to a dispenser body;

attaching the multiple payload set to the dispenser body via the first attachment means;

knocking down the GSE and removing the GSE pieces from the payload dispenser by detachment of the third attachment means from the second attachment means.

BRIEF DESCRIPTION OF THE DRAWINGS

The disclosure will be described in greater detail in the following, with reference to the attached drawings, in which:

FIG. 3b schematically shows a side view of the multiple payload set in FIG. 3a;

FIG. 4a schematically shows a side view of a multiple payload set according to FIGS. 2b and 3b with two payloads connected to the connection structure;

FIG. 4b schematically shows a front view of a ground support equipment, GSE, before attachment of the payload to the GSE;

FIG. 4c schematically shows a front view of two payload assemblies attached to the ground support equipment, GSE, before attachment of the payload to the dispenser unit;

FIG. 5a schematically shows a front view of an assembled GSE according to one example;

FIG. 5b schematically shows a front view of a disassembled GSE according to FIG. 5a;

FIG. 6a schematically shows a front view of an assembled GSE according to one example;

FIG. 6b schematically shows a front view of a disassembled GSE according to FIG. 6a;

FIG. 11 schematically shows a side view of the assembled payload dispenser according to FIG. 10, and wherein;

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
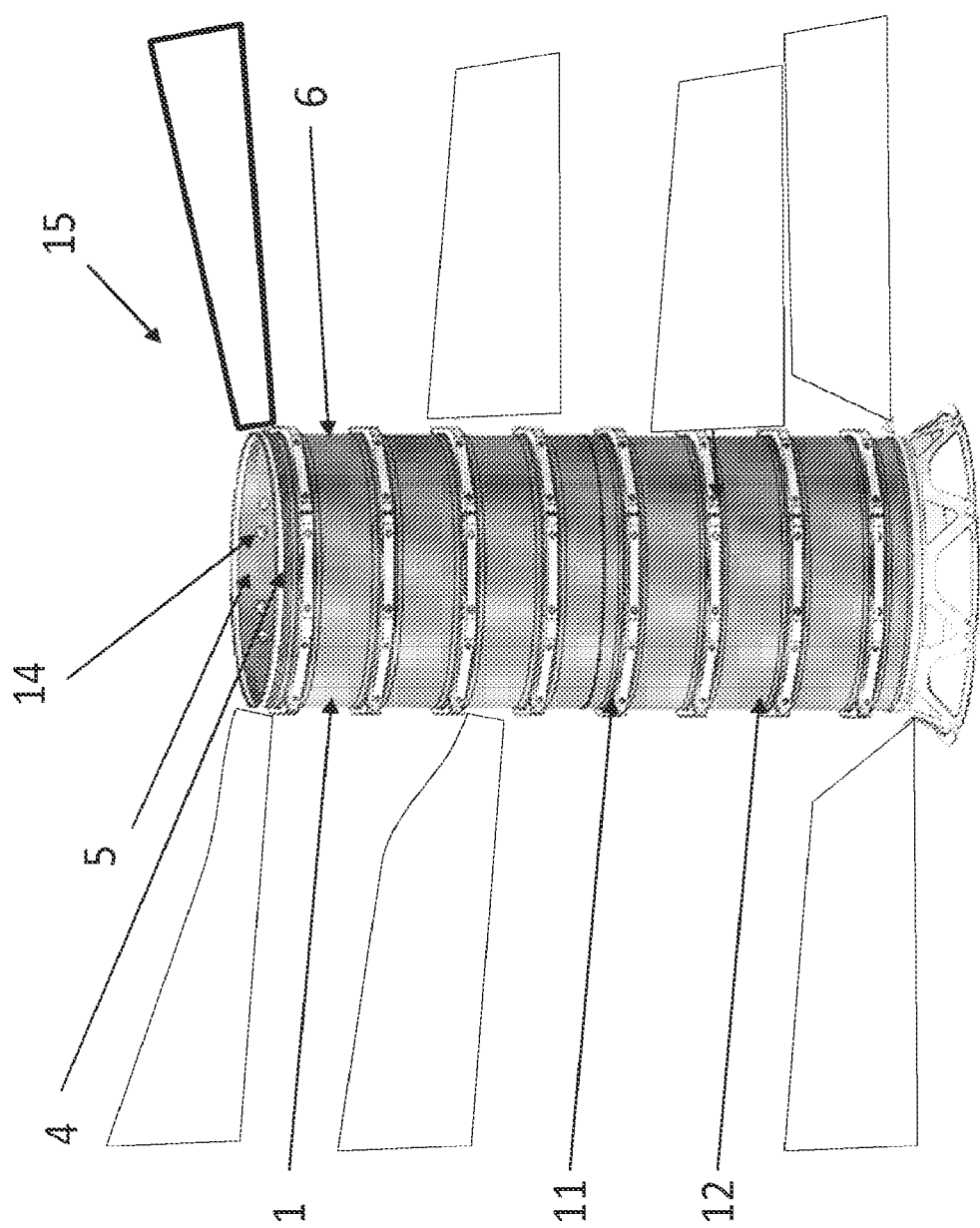
FIG. 1 schematically shows a perspective view of a dispenser body.
Figure 10:
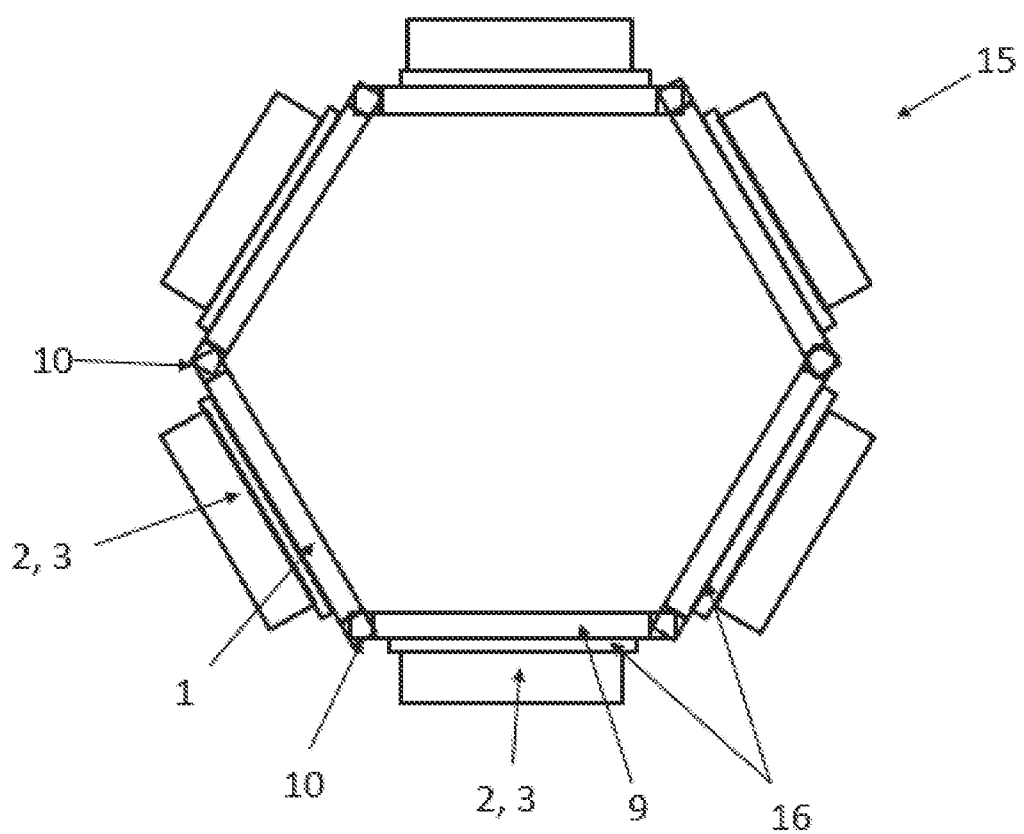
FIG. 10 schematically shows a top view of an assembled payload dispenser according to one example.

FIG. 1 schematically shows a perspective view of a dispenser body 1 for a launch vehicle (not shown). The dispenser body 1 is arranged to carry a payload 2 and multiple payload set 3, see FIG. 2, to be dispensed from the launch vehicle at a predetermined point in time. In FIG. 1 the dispenser body 1 has a circular cross-section, but alternatives to this are possible. For example, the dispenser body 1 may have a polygonal cross-section as shown in FIG. 10 or an oval cross-section (not shown) or any other suitable shape. The dispenser unit may be uniform in a longitudinal direction X or may vary in shape in the longitudinal direction X. Here, longitudinal direction X refers to a height direction of the dispenser body 1. The dispenser body is limited in a radial direction R by an envelope surface of the dispenser body 1. Here, the radial direction R is a direction perpendicular to the longitudinal direction X. The dispenser body 1 comprises a through channel 4 in the longitudinal direction X. The dispenser body 1 has an inner surface 5 facing towards the channel 4 and an outer surface 6 facing away from a centre of the dispenser body 1.

Figure 11:
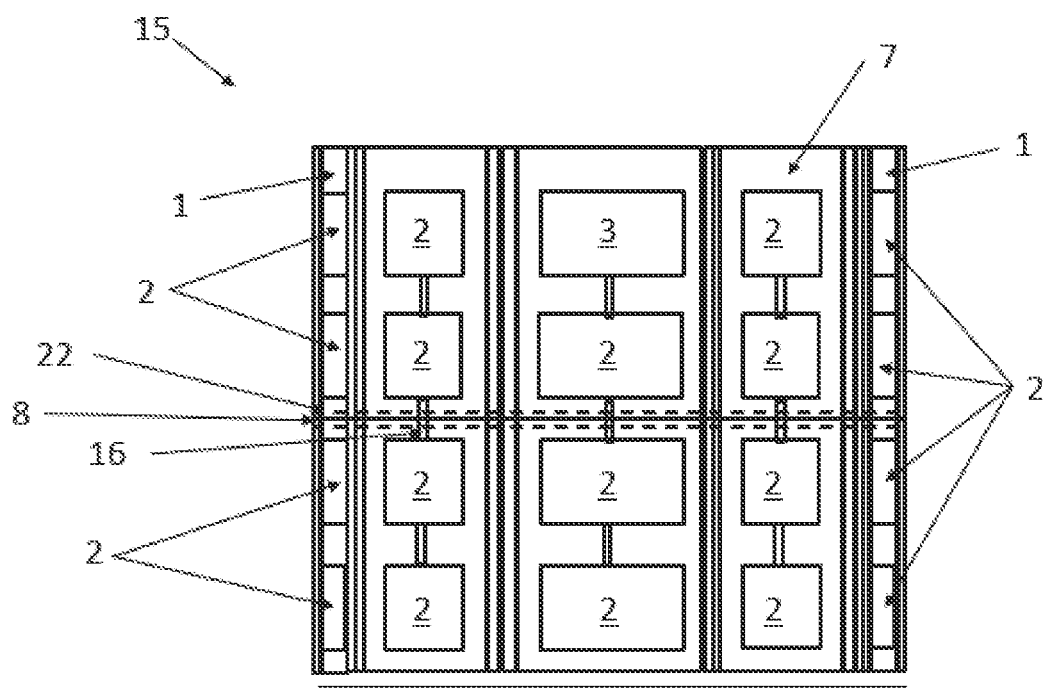

The dispenser body 1 can be made in one piece, as shown in FIG. 1, or may be made from a number of dispenser body elements 7. The dispenser body elements 7 may be ring formed parts that are stacked onto and attached to each other in the longitudinal direction along laterally extending joints 8, see for example FIG. 11. The dispenser body elements 7 may be panels 9 that are attached to each other along longitudinally extending joints 10 as seen in FIG. 10. The dispenser body 1 may also be built from a combination of ring formed parts and panels, for example as shown in FIGS. 10 and 11 combined.

Figure 7:
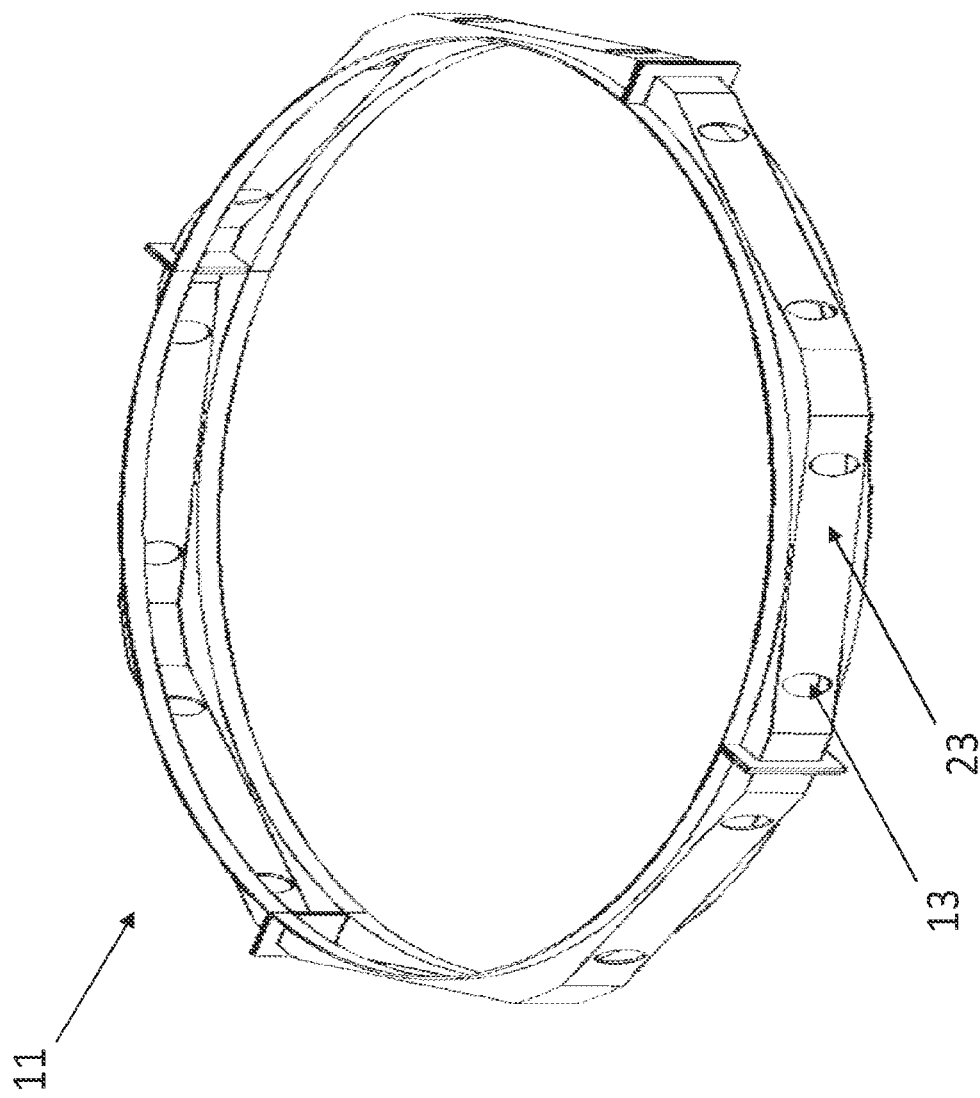
FIG. 7 schematically shows a rail unit ring bracket according to one example attached to the dispenser body in FIG. 1.

In FIG. 1 a number of rail unit ring brackets 11, shown in FIG. 7, are mounted onto the envelope surface 12 of the dispenser body 1. The rail unit ring brackets 11 comprise through openings 13 for receiving the first attachment means 17, see FIG. 8, on the multiple payload set 3 during attachment of the multiple payload set 3 to the dispenser body 1. The rail unit ring bracket through openings 13 are aligned with openings 14 in the dispenser body for allowing the first attachment means 17 to extend into the channel 4 so that the first attachment means 17 can be secured in position to the dispenser body 1. For example, the first attachment means 17 can be secured in position against the inner surface 5 of the dispenser body 1 via a nut and bolt arrangement. According to another example, the first attachment means 17 can be secured in position to the dispenser body 1 via the rail unit ring brackets 11. According to another example, see for example according to FIG. 10, the multiple payload set 3 can be mounted onto the dispenser body 1 either directly or via adapters.

Figure 2C:
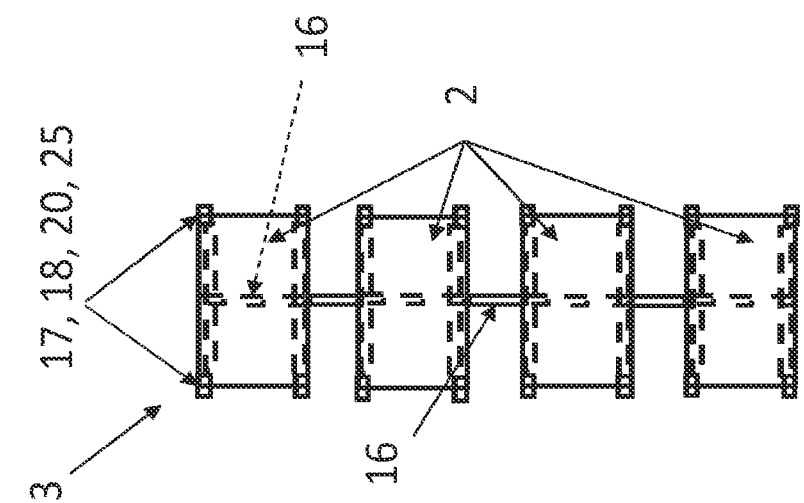
FIG. 2c schematically shows a front view of FIG. 2b.
Figure 2B:
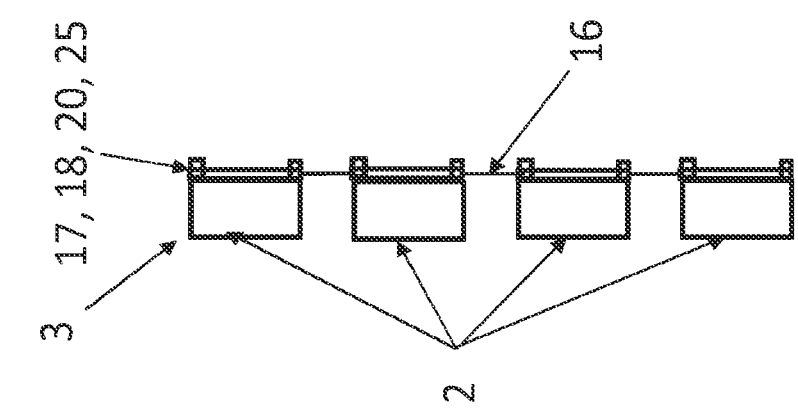
FIG. 2b schematically shows a side view of a number of payloads connected to the connection structure.
Figure 2A:
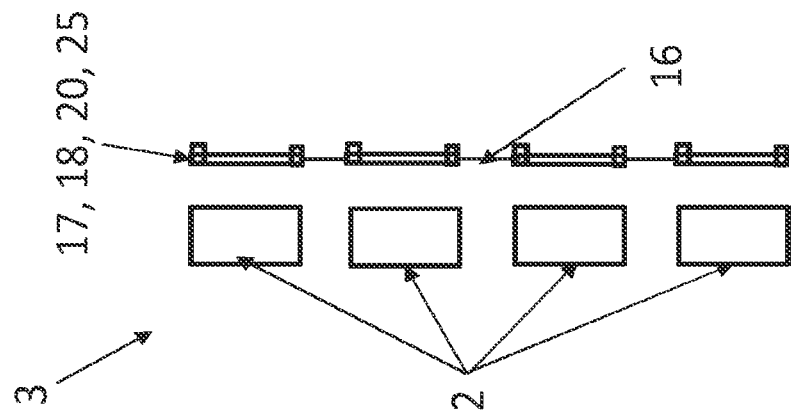
FIG. 2a schematically shows a side view of a number of payloads and a side view of a connection structure before the payloads are connected to the connection structure.

FIG. 2a schematically shows a side view of a number of payloads 2 and a side view of a connection structure 16 before the payloads are connected to the connection structure 16.

FIG. 2b schematically shows a side view of a number of payloads 2 connected to the connection structure 16.

FIG. 2c schematically shows a front view of FIG. 2b. FIGS. 2a-2c schematically shows a multiple payload set 3 for a launch vehicle. The multiple payload set 3 comprises a plurality of payloads 2. The payloads 2 are interconnected via a non-self-supported connection structure 16 before assembly of the multiple payload set 3 to the dispenser body 1.

Figure 3B:
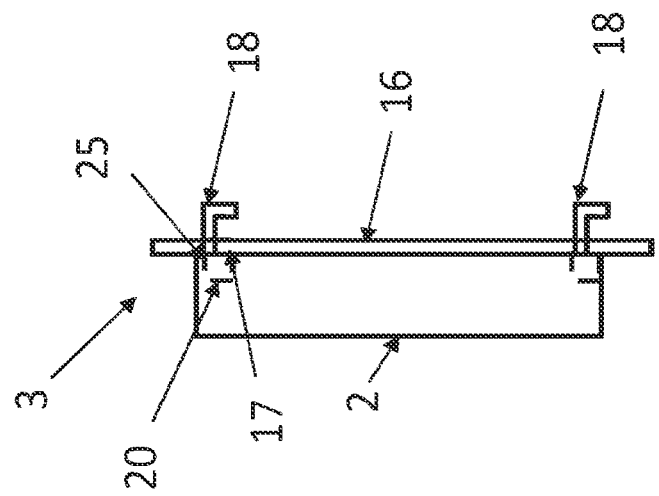
Figure 3A:
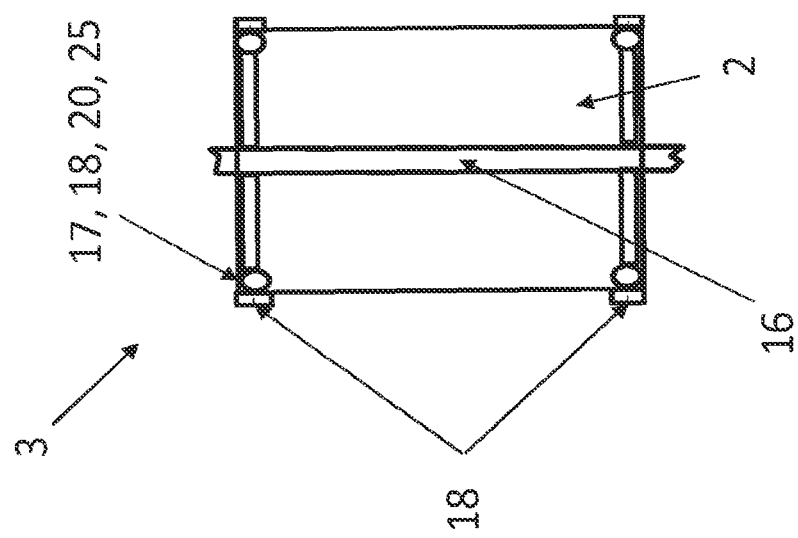
FIG. 3a schematically shows a back view of a multiple payload set.

FIG. 3a schematically shows a back view of a part of the multiple payload set in FIGS. 2a-2c with one payload 2 attached to the connection structure 16.

FIG. 3a shows that each payload 2 comprises first attachment means 17 attachable to the connection structure 16. The connection structure comprises second attachment means 18 attachable to a ground support equipment, GSE, 19 before and during attachment of the multiple payload set to the dispenser body 1. The GSE 19 is shown in FIGS. 4, 5a, 5b, 6a and 6b.

The second attachment means 18 are arranged in connection to the first attachment means 17 and the connection structure comprises reinforcement means 25 arranged to mechanically connect the second attachment means 18 to the first attachment means 17 to form a load bearing structure 20. The second attachment means 18 are formed such that the GSE 19 can easily be connected and disconnected. The load bearing structure 20 shall transfer load from the payload 2 to the GSE 19 in order to hold the payload assemblies 3 in place when the GSE 19 is moved horizontally and also tilted vertically with the payload assemblies 3 attached to the GSE 19. The GSE 19 shall be stiff enough to allow for moving the payload assemblies 3 accordingly without compromising the non-self-supported connection structure between the payloads 2.

The non-self-supported connection structure 16 may be a tube or the like that can house cables, contacts, attachment means etc. According to one example, the connection structure 16 is a rail structure interconnecting the payloads 2. In the example, the cables connect various applications within and between each multiple payload set. For example, the payload assemblies 3 can be attached to the dispenser body 1 via separation devices, i.e. the first attachment means 17, which separates dependent on a signal from a control unit (not shown). The connection of all separation devices to the control unit allows for timing of the separation of payloads 2. According to one example, there are four separation devices per multiple payload set 3 for symmetry reasons. Hence, each multiple payload set 3 comprises first attachment means 17 for attachment to the dispenser body 1 during attachment of the multiple payload set 3 to the dispenser body 1.

According to FIG. 3a the multiple payload set 3 comprises four first attachment means 17, four second attachment means 18 and four reinforcement means 25 for creating the load bearing structure 20. It should be noted that a different number of first attachment means 17, second attachment means 18 and reinforcement means 25 are possible.

FIG. 3b schematically shows a side view of the multiple payload set 3 in FIG. 3a. FIG. 3b shows that the second attachment means 18 are made in the form of hooks that can engage the GSE 19. The second attachment means 18 can be arranged in other forms than hooks as long as the second attachment means 18 cooperates with third attachment means 24 of the GSE 19.

FIG. 4a schematically shows a side view of two payloads 2 connected to the connection structure 16 according to FIGS. 2b, 2c, and FIG. 4b schematically shows a front view of a ground support equipment, GSE, 19 before attachment of the multiple payload set 3 to the GSE.

FIG. 4c schematically shows a front view of two payload assemblies 3 attached to the ground support equipment, GSE, 19 before attachment of the payload assemblies to the dispenser body 1. In other words, the disclosure relates to an assembly comprising a multiple payload set 3 for a launch vehicle and a stiff and rigid ground support equipment 19, wherein the multiple payload set 3 comprises a plurality of payloads 2, wherein the plurality of payloads 2 are interconnected via a non-self-supported connection structure 16 before assembly of the multiple payload set 3 to a dispenser body 1, wherein each payload 2 comprises first attachment means 17 attached to the non-self-supported connection structure 16, wherein the non-self-supported connection structure 16 comprises second attachment means 18 attached to the ground support equipment 19, for attachment of the multiple payload set 3 to the dispenser body 1, wherein the ground support equipment 19 is attached to the multiple payload set 3 via the second attachment means 18 to reinforce and secure the multiple payload set 3 to enable transport and maneuverability of the multiple payload set 3 without jeopardizing the non-self-supported connection structure 16.

FIG. 5a schematically shows a front view of an assembled GSE 19 according to one example. FIG. 5a shows that the GSE 19 comprises two longitudinally extending beams 21 and five laterally extending beams 22. The laterally extending beams 22 give the GSE 19 support and strength to manoeuvre the payload assemblies without compromising the connection structure. The number of laterally extending beams 22 can vary dependent on the design. Should the longitudinally extending beams 21 be formed as a framework of beams, then the number of laterally extending beams 22 can be less. For example, FIG. 6a shows a front view of an assembled GSE 19 according with only two laterally extending beams 22.

FIGS. 5a and 6a shows the GSE 19 in an assembled state where the beams (21; 22) form a frame designed to fit and carry the subset of payloads. FIGS. 5b and 6b show a front view of a dis-assembled GSE 19 according to FIGS. 5a and 5b respectively. In the collapsed state the longitudinal beams 21 are designed to fit and be removed between two neighbouring payloads 2 attached to the payload dispenser body 1. FIG. 6b shows that the longitudinal beams 21 comprise beam portions arranged to be attached to each other to form the longitudinal beam 21. The longitudinal beam 21 can be disassembled into the beam portions to allow for easy removal of the portions. FIG. 6b also shows that the lateral beams 22 comprises beam portions for the same purpose. The lateral beams and beam portions may also be arranged to be removed between two adjacent payloads.

According to one example, the longitudinally extending beams 21 comprise third attachment means 24 attachable to the second attachment means 18 in the multiple payload set 3. The third attachment means 24 can as an alternative be positioned on the laterally extending beams 22 or a combination of the longitudinally extending beams 21 and the laterally extending beams 22.

FIG. 7 schematically shows a rail unit ring bracket 11 according to one example attached to the dispenser body 1 in FIG. 1. The rail unit ring bracket 11 comprises through openings 13 for receiving the first attachment means 17, see FIG. 8, on the multiple payload set 3 during attachment of the multiple payload set 3 to the dispenser body. The rail unit ring bracket through openings 13 are aligned with through openings 14 in the dispenser body 1 for allowing the first attachment means 17 to extend into the channel 4 so that the first attachment means 17 can be secured in position to the dispenser body 1. The rail unit ring bracket 11 comprises an assembly surface 23 arranged to receive the multiple payload set. In FIG. 7, the assembly surface 23 is flat, but other shapes are possible to accommodate and fit against the multiple payload set 3. The multiple payload set 3 may comprise an assembly surface that corresponds in shape to the assembly surface 23 of the rail unit ring bracket 11. In FIG. 7, the through openings 13 for receiving first attachment means 17 are positioned in the assembly surface.

According to another example, the through openings 13 for receiving first attachment means 17 are positioned outside the assembly surface 23. According to one example, the rail unit ring bracket 11 surrounds the dispenser body 1 and reinforces the dispenser body 1.

Figure 8:
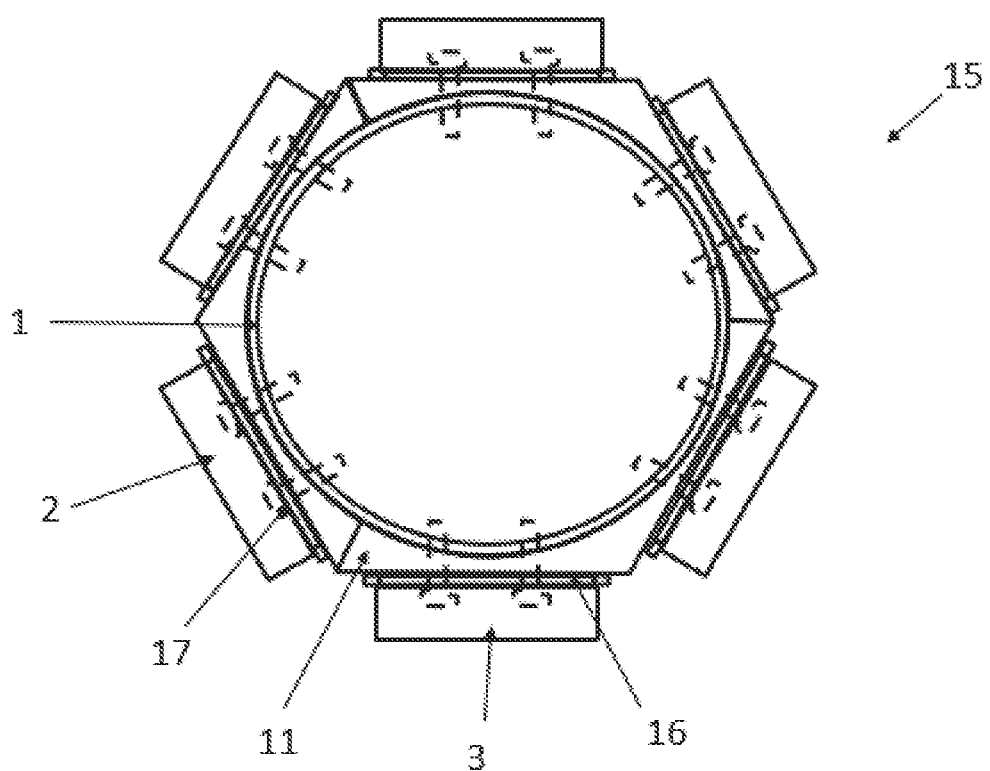
FIG. 8 schematically shows a top view of an assembled payload dispenser according to one example.

FIG. 8 schematically shows a top view of an assembled payload dispenser 15 according to one example including a dispenser body according to FIG. 1 and rail unit ring brackets 11 according to FIG. 7. FIG. 8 shows the first attachment means 17 running through the multiple payload set and the dispenser body 1 attaching the multiple payload set 3 to the dispenser body 1.

Figure 9:
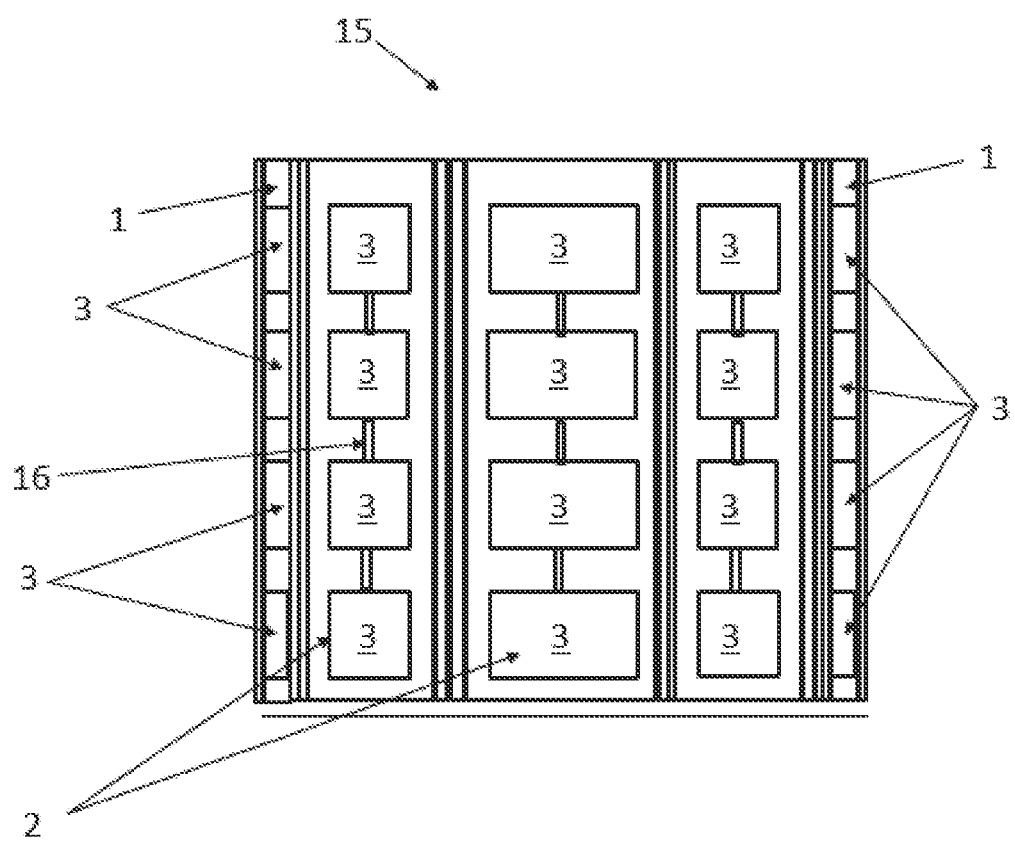
FIG. 9 schematically shows a side view of the assembled payload dispenser according to FIG. 8.

FIG. 9 schematically shows a side view of the assembled payload dispenser 3 according to FIG. 8.

FIG. 10 schematically shows a top view of an assembled payload dispenser 15 according to one example where the dispenser body 1 comprises a plurality of panels 9, wherein at least one panel 9 comprises at least one multiple payload set mounted onto the panel. The panels are attachable to each other forming a self-supporting dispenser.

FIG. 11 schematically shows a side view of the assembled payload dispenser 15 according to FIG. 10.

Figure 12:
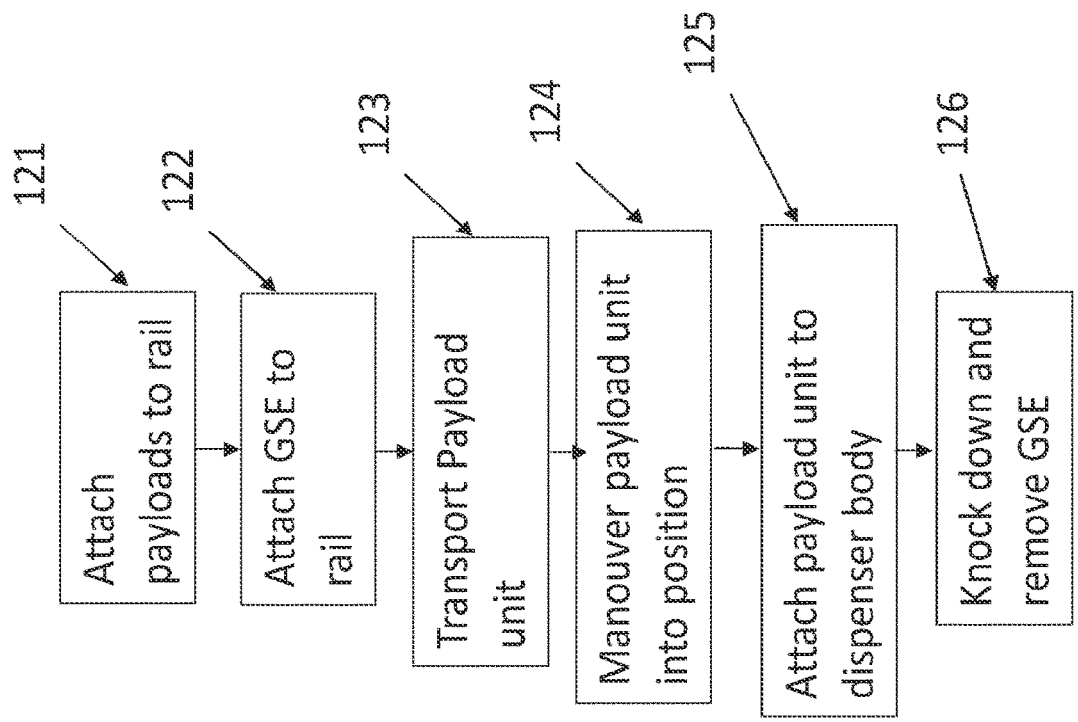
FIG. 12 schematically shows a flow chart of a method.

FIG. 12 schematically shows a flow chart of a method for assembling a payload dispenser 15 according to what has been discussed in connection to FIGS. 1-11. The method comprises the following steps:

Box 121:
attaching a plurality of payloads to a non-self-supported connection structure (16) via first attachment means (17) creating a multiple payload set (3);

Box 122:
attaching a ground support equipment, GSE, (19) to the connection structure (16), the GSE, (19) comprising third attachment means (24) and the connection structure (16) comprising second attachment means (18) comprised in the connection structure (16) being connected to the first attachment means (17) via reinforcement means (25), wherein the third attachment means (24) are attached to the second attachment means (18) when attaching the GSE (19) to the connection structure (16);

Box 123:
transporting the ground support equipment, GSE, (19) and the attached multiple payload set (3);

Box 124:
maneuvering the ground support equipment, GSE, (19) and the attached multiple payload set (3) into position with relation to a dispenser body (1);

Box 125:
attaching the multiple payload set (3) to the dispenser body (1) via the first attachment means (17);

Box 126:
knocking down the GSE (19) and removing the GSE pieces from the payload dispenser by detachment of the third attachment means (24) from the second attachment means (18).

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1. Dispenser body
2. Payload
3. Multiple payload set
4. Channel
5. Inner surface of dispenser body
6. Outer surface of dispenser body
7. Dispenser body elements
8. Laterally extending joints
9. Panels
10. Longitudinally extending joints
11. Rail unit ring brackets
12. Envelope surface
13. Through openings in rail unit ring brackets
14. Through openings in dispenser body
15. Assembled payload dispenser
16. Non-self-supported connection structure
17. First attachment means
18. Second attachment means
19. Ground Support Equipment, GSE
20. Load Bearing Structure
21. Two Longitudinally Extending Beams
22. Laterally Extending Beams
23. Rail Unit Ring Bracket Assembly Surface
24. Third Attachment Means
25. Reinforcement Means

The invention claimed is:

1. An assembly comprising:
a multiple payload set for a launch vehicle; and
a stiff and rigid ground support equipment,
wherein the multiple payload set comprises a plurality of payloads,
wherein the plurality of payloads are interconnected via a non-self-supported connection structure before assembly of the multiple payload set to a dispenser body,
wherein each payload comprises first attachment means attached to the non-self-supported connection structure,
wherein the non-self-supported connection structure comprises second attachment means attached to the ground support equipment for attachment of the multiple payload set to the dispenser body, and
wherein the ground support equipment is attached to the multiple payload set via the second attachment means to reinforce and secure the multiple payload set to enable transport and maneuverability of the multiple payload set without jeopardizing the non-self-supported connection structure.

2. The assembly according to claim 1, wherein the non-self-supported connection structure is designed to align the payloads according to a predetermined pattern.

3. The assembly according to claim 1, wherein the second attachment means are connected to the first attachment means and wherein the non-self-supported connection structure comprises reinforcement means arranged to mechanically connect the second attachment means to the first attachment means to form a load bearing structure.

4. The assembly according to claim 3, wherein the second attachment means is configured to make the ground support equipment connectable and disconnectable with the multiple payload set, wherein the load bearing structure is configured to transfer load from the payload to the ground support equipment in order to hold the multiple payload set in place when the ground support equipment is moved horizontally and also tilted vertically with the multiple payload set attached to the ground support equipment, and wherein the ground support equipment is stiff enough to allow for moving the multiple payload set without compromising the non-self-supported connection structure between the payloads.

5. The assembly according to claim 1, wherein the non-self-supported connection structure comprises a maximum number of second attachment means corresponding to the number of first attachment means.

6. The assembly according to claim 1, wherein the first attachment means are separation devices.

7. The assembly according to claim 1, wherein the non-self-supported connection structure is a rail structure.

8. The assembly according to claim 1, further including a dispenser body carrying the multiple payload set.

9. The assembly according to claim 8, wherein the dispenser body comprises rail unit ring brackets mounted onto an envelope surface of the dispenser body.

10. The assembly according to claim 9, wherein the rail unit ring brackets comprise through openings for receiving the first attachment means on the multiple payload set during attachment of the multiple payload set to the dispenser body.

11. The assembly according to claim 8, wherein the dispenser body is formed of one or more ring shaped bodies.

12. The assembly according to claim 8, wherein the dispenser body comprises a plurality of panels, wherein one of the panels comprises the multiple payload set mounted onto the panel, wherein the panels are attachable to each other forming a self-supporting dispenser.

13. The assembly according to claim 1, wherein the ground support equipment comprises at least two longitudinally extending beams and at least two laterally extending beams, wherein in an assembled state the beams form a frame designed to fit to carry a subset of payloads, and wherein in a collapsed state the longitudinal beams and/or the laterally extending beams are designed to be removed between two neighboring payloads attached to the dispenser body.

14. The assembly according to claim 13, wherein the longitudinally extending beams comprise third attachment means attachable to the second attachment means in the multiple payload set.

15. An assembly comprising:
a multiple payload set for a launch vehicle, and
a stiff and rigid ground support equipment,
wherein the multiple payload set comprising a plurality of payloads,
wherein the plurality of payloads are interconnected via a non-self-supported connection structure before assembly of the multiple payload set to a dispenser body,
wherein each payload comprises separation devices attached to the non-self-supported connection structure,
wherein the non-self-supported connection structure comprises hooks attached to the ground support equipment, for attachment of the multiple payload set to the dispenser body, and
wherein the ground support equipment is attached to the multiple payload set via the hooks to reinforce and secure the multiple payload set to enable transport and maneuverability of the multiple payload set without jeopardizing the non-self-supported connection structure.

16. The assembly according to claim 15, wherein the non-self-supported connection structure is a rail structure.

17. The assembly according to claim 15, further comprising a dispenser body carrying the multiple payload set.

18. The assembly according to claim 15, wherein the ground support equipment comprises at least two longitudinally extending beams and at least two laterally extending beams, wherein in an assembled state the beams form a frame designed to carry a subset of payloads, and wherein in a collapsed state the longitudinal beams and/or the laterally extending beams are designed to be removed between two neighboring payloads attached to the dispenser body.

19. The assembly according to claim 18, wherein the longitudinally extending beams comprise third attachment means attachable to the hooks in the multiple payload set.

20. A method for assembling a payload dispenser, the method comprising:
attaching a plurality of payloads to a non-self-supported connection structure via first attachment means creating a multiple payload set;
attaching a ground support equipment to the non-self-supported connection structure, the ground support equipment comprising third attachment means and the non-self-supported connection structure comprising second attachment means comprised in the non-self-supported connection structure being connected to the first attachment means via reinforcement means, wherein the third attachment means are attached to the second attachment means when attaching the ground support equipment to the non-self-supported connection structure;
transporting the ground support equipment and the attached multiple payload set;
maneuvering the ground support equipment and the attached multiple payload set into position with relation to a dispenser body;
attaching the multiple payload set to the dispenser body via the first attachment means; and
knocking down the ground support equipment and removing the ground support equipment pieces from the payload dispenser by detachment of the third attachment means from the second attachment means.

* * * * *